US009813225B2

(12) United States Patent
Chandhoke et al.

(10) Patent No.: US 9,813,225 B2
(45) Date of Patent: *Nov. 7, 2017

(54) LOSSLESS TIME BASED DATA ACQUISITION AND CONTROL IN A DISTRIBUTED SYSTEM

(71) Applicant: NATIONAL INSTRUMENTS CORPORATION, Austin, TX (US)

(72) Inventors: Sundeep Chandhoke, Austin, TX (US); Brian Keith Odom, Georgetown, TX (US)

(73) Assignee: National Instruments Corporation, Austin, TX (US)

(*) Notice: Subject to any disclaimer, the term of this patent is extended or adjusted under 35 U.S.C. 154(b) by 417 days.

This patent is subject to a terminal disclaimer.

(21) Appl. No.: 14/512,203

(22) Filed: Oct. 10, 2014

(65) Prior Publication Data

US 2015/0124621 A1    May 7, 2015

Related U.S. Application Data

(63) Continuation-in-part of application No. 14/072,297, filed on Nov. 5, 2013, now Pat. No. 9,246,852.

(51) Int. Cl.

| H04J 3/14 | (2006.01) |
|---|---|
| H04L 7/00 | (2006.01) |
| H04L 12/855 | (2013.01) |
| H04L 12/927 | (2013.01) |
| H04L 7/04 | (2006.01) |
| G06F 13/42 | (2006.01) |

(52) U.S. Cl.
CPC ........ H04L 7/0008 (2013.01); G06F 13/4291 (2013.01); H04L 7/048 (2013.01); H04L 47/2466 (2013.01); H04L 47/803 (2013.01)

(58) Field of Classification Search
None
See application file for complete search history.

(56) References Cited

U.S. PATENT DOCUMENTS

| 6,085,270 A | 7/2000 | Gulick |
| 6,408,351 B1 | 6/2002 | Hamdi et al. |
| 9,246,852 B2 * | 1/2016 | Chandhoke ......... H04L 49/9094 |

OTHER PUBLICATIONS

International Search Report for Application No. PCT/US2014/060314, dated Feb. 17, 2015; 4 pages.

* cited by examiner

*Primary Examiner* — Willie J Daniel, Jr.
(74) *Attorney, Agent, or Firm* — Meyertons Hood Kivlin Kowert & Goetzel, P.C.; Jeffrey C. Hood; Brian E. Moore (57) ABSTRACT

Systems and methods for mapping a time-based data acquisition (DAQ) to an isochronous data transfer channel of a network. A buffer associated with the isochronous data transfer channel of the network may be configured. A clock and a local buffer may be configured. A functional unit may be configured to initiate continuous performance of the time-based DAQ, transfer data to the local buffer, initiate transfer of the data between the local buffer and the buffer at a configured start time, and repeat the transferring and initiating transfer in an iterative manner, thereby transferring data between the local buffer and the buffer. The buffer may be configured to communicate data over the isochronous data transfer channel of the network, thereby mapping the time-based DAQ to the isochronous data transfer channel of the network.

22 Claims, 7 Drawing Sheets

LOSSLESS TIME BASED DATA ACQUISITION AND CONTROL IN A DISTRIBUTED SYSTEM

CONTINUATION AND PRIORITY DATA

This application is a Continuation-In-Part of U.S. patent application Ser. No. 14/072,297, titled "Lossless Time Based Data Acquisition and Control in a Distributed System", filed Nov. 5, 2013, whose inventors are Sundeep Chandhoke and Brian Keith Odom, and which is hereby incorporated by reference in its entirety as though fully and completely set forth herein.

FIELD OF THE INVENTION

The present invention relates to the field of isochronous data transfer, and more particularly to a system and method for a time-based waveform acquisition engine.

DESCRIPTION OF THE RELATED ART

Time based, or isochronous (i.e., regular, periodic), data transfer is used by control applications in which timely transfer of a data stream or buffer is of utmost importance. If for any reason data arrive late they cannot be used and are discarded. Accordingly, control based applications are typically designed to tolerate some loss or late arrival of data. For example, in some control based applications, if data for one control period are lost, the applications can detect this and defer the control loop calculation until the next period. Additionally, if data continued to arrive late or did not arrive at all for multiple control loops, the control based application could flag an error and take more severe actions.

Furthermore, networks and processor interconnects have implemented features specific to the support of isochronous data transfer for control based applications. For example, features in standards such as PCI Express and time-sensitive (TS) networking (i.e., IEEE 802.1) incorporate support for isochronous data transfer. These features incorporate the two fundamental requirements necessary to support isochronous data transfer—first, the requirement that there is synchronization between endpoints participating in isochronous data transfer, thus guaranteeing the coordinated transmission and reception of data; and second, the requirement that there is reserved bandwidth all the way from the producer of the data to the consumer of the data, thus guaranteeing the delivery and the synchronization of endpoints.

There are new advances in applications that may benefit from these fundamental requirements of isochronous data transfer. For example, the so-called "Internet of Things" is expanding Internet connectivity to machines in a broad range of fields from power systems to medical devices, among others. In such applications, the most common usage of data is aggregation for analysis or logging. Furthermore, since measurement nodes that acquire data in these applications are typically distributed over wide geographical areas, conventional signal based synchronization techniques cannot be applied. Instead, time is used to synchronize measurements and data are acquired either via finite or continuous acquisition.

In a finite acquisition, a set of data points is acquired at periodic intervals, e.g., a set of data points per interval. Each interval is synchronized in phase and frequency amongst all nodes in a system. Examples of such systems include power phasor measurement units as well as structural and machine monitoring systems.

In a continuous acquisition, data are continuously acquired once the acquisition has been started. The start time, $t_0$, and the time between acquisitions, $\Delta t$, are synchronized amongst all nodes in a system. Additionally, the acquisition generally terminates only when a command explicitly terminating the acquisition is received. An example of such a system is an in-vehicle data logger.

In such time-based data acquisition systems, since data are aggregated, applications may tolerate late arrival of data but not loss. Hence, currently data transferred in these systems are treated either independently of isochronous data, e.g., transferred as best effort or asynchronous data, or aggregated at the endpoints by transmitting one data point at a time using an isochronous channel. Treatment of the data as independent of isochronous data addresses the lossless requirement by acknowledging the data transfer and retransmitting it in case of loss. Use of an isochronous channel uses the reserved bandwidth on the isochronous channel to eliminate loss due to congestion, but does not handle the case for loss due to electromagnetic interference (EMI) or data corruption due to bit errors on the network or bus. Additionally, in prior approaches, aggregation at the endpoints and use of the isochronous channel can only be mapped to finite acquisition and cannot address the continuous acquisition model. Thus, improvements in data transfer in such systems are sought.

For example, improvements in the timely delivery of time based measurements would provide multiple benefits. First, timely delivery may reduce aggregation latency, thereby improving processing efficiency. Additionally, timely delivery may improve monitoring cycle time, allowing real-time analysis and data set reduction, from a storage prospective, and allow for faster response times. Timely delivery may also increase network bandwidth utilization by reducing delays due to retransmission and congestion and improve coexistence with control systems without introducing jitter. Further, timely delivery may allow for the introduction of new control models where algorithms may use coherent sets of aggregated waveforms as inputs to compute control outputs. Finally, timely delivery may reduce and simplify memory management allowing for precise pre-runtime allocation to match acquisition rate using data transfer rate. Since there are a multitude of advantages to improving the timely delivery of time based measurements, the current application describes various embodiments of a novel way of mapping time-based data acquisitions into an isochronous data transfer channel.

SUMMARY OF THE INVENTION

Various embodiments of a system and method for configuring and performing a mapping of a continuous time-based data acquisition (DAQ) to an isochronous data transfer channel of a network are presented below.

In one embodiment, a system for mapping a continuous time-based data acquisition to an isochronous data transfer channel of a network may include a functional unit, a local buffer, and a buffer. The network may be a real time network, an Ethernet network, or a memory mapped bus. The local buffer may be coupled to the functional unit and may be configured to receive data from the continuous time-based data acquisition. The buffer may be associated with the isochronous data transfer channel. The buffer may be coupled to the functional unit and the local buffer, and may be configured to receive data from the local buffer. The system (e.g., the functional unit) may be configured via the methods presented below.

The functional unit may be configured to initiate performance of the continuous time-based DAQ. The continuous time-based DAQ may be performed according to a clock. In one embodiment, the clock may be configured to synchronize to a global clock of the network. The data from the continuous time-based DAQ may be stored in the local buffer. Further, the functional unit may be configured to initiate continuous transfer of the data from the local buffer to the buffer. The transfer from the local buffer to the buffer may be performed according to the first clock.

In one embodiment, the buffer may have a configurable buffer size and a configurable transfer frequency. Further, the local buffer may have a size and the size may be configured based on a transfer frequency of the buffer and a data rate of the continuous time-based DAQ.

In some embodiments, the functional unit may be configured to initiate performance of the continuous time-based DAQ at a start time of the continuous time-based DAQ, and to initiate continuous transfer of the data from the local buffer to the buffer at a start time of the continuous transfer. The start time of the continuous transfer may be based on a buffer size of the buffer, the start time of the continuous time-based DAQ, and a data rate of the continuous time-based DAQ. In one embodiment, the start time of the continuous time-based data acquisition may be in phase with a global clock of the network.

In certain embodiments, the functional unit may be configured to perform a data integrity process during the continuous transfer, thereby preventing data loss. The data integrity process may include embedding a forward error correction code in the data.

In one embodiment the system may include additional local buffers and each additional local buffer may be configured to receive data from a respective additional continuous time-based DAQ. In such embodiments, the functional unit may be configured to, for each respective additional continuous time-based DAQ, initiate performance of the respective additional continuous time-based DAQ and initiate continuous transfer of the data from the respective local buffer to the buffer according to the respective clock. Note that the respective additional continuous time-based DAQ may be performed according to a respective clock, and the data from the respective additional continuous time-based DAQ may be stored in a respective local buffer of the additional local buffers.

An exemplary method for configuring the mapping of a continuous time-based DAQ an isochronous data transfer channel of a network may include configuring a local buffer for receipt of data from the continuous time-based DAQ, configuring a buffer for receipt of data from the local buffer, and configuring a functional unit as described above. Note that the buffer may be associated with the isochronous data transfer channel, the isochronous data transfer channel may have an associated bandwidth, and configuring the buffer may reserve the associated bandwidth.

An exemplary method for mapping a continuous time-based DAQ to an isochronous data transfer channel of a network may include configuring a local buffer for receipt of the data from the continuous time-based DAQ, configuring a buffer that may be coupled to the isochronous data transfer channel for receipt of data from the local buffer. Further, the continuous time-based DAQ may be performed according to a clock and the data from the continuous time-based DAQ may be stored in the local buffer. The continuous transfer of the data from the local buffer to the buffer may be performed according to the clock and the data may be isochronously provided from the buffer to the isochronous data channel.

BRIEF DESCRIPTION OF THE DRAWINGS

A better understanding of the present invention can be obtained when the following detailed description of the preferred embodiment is considered in conjunction with the following drawings, in which.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference

The following references are hereby incorporated by reference in its entirety as though fully and completely set forth herein:

U.S. patent application Ser. No. 14/072,297, titled "Lossless Time Based Data Acquisition and Control in a Distributed System", filed Nov. 11, 2013.

U.S. patent application Ser. No. 13/244,572 titled "Configuring Buffers with Timing Information," filed on Sep. 25, 2011.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Program—the term "program" is intended to have the full breadth of its ordinary meaning. The term "program" includes 1) a software program which may be stored in a memory and is executable by a processor or 2) a hardware configuration program useable for configuring a programmable hardware element.

Graphical Program—A program comprising a plurality of interconnected nodes or icons, wherein the plurality of interconnected nodes or icons visually indicate functionality of the program. The interconnected nodes or icons are graphical source code for the program. Graphical function nodes may also be referred to as blocks.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW®, DasyLab™, DIADem™ and Matrixx/SystemBuild™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks (i.e., nodes) or icons that visually indicate operation of the model or block diagram; exemplary graphical modeling environments include Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks or nodes are often referred to as the block diagram portion of the graphical program.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are configured to acquire and/or store data. A measurement device may also optionally be further configured to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further configured to perform control functions, e.g., in response to analysis of the acquired or stored data. For example, the measurement device may send a control signal to an external system, such as a motion control system or to a sensor, in response to particular data. A measurement device may also be configured to perform automation functions, i.e., may receive and analyze data, and issue automation control signals in response.

Functional Unit (or Processing Element)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Lossless—refers to a class of data compression algorithms allowing reconstruction of the exact original data from compressed data.

Forward Error Correction (FEC)—refers to a technique for controlling errors in data transmission in which redundancy in the sender message prevents data loss due to bit errors and network reconfiguration.

Finite Acquisition—refers to an acquisition in which a set of data points is acquired at periodic intervals. Each interval is synchronized in phase and frequency amongst all nodes in a system.

Continuous Acquisition—refers to an acquisition in which data are continuously acquired once the acquisition has been started. The start time, $t_0$, and the time between acquisitions, $\Delta t$, are synchronized amongst all nodes in a system. Additionally, the acquisition may terminate only when a command explicitly terminating the acquisition is received Internet Protocol (IP)—refers to the networking model and a set of protocols for communication used for networks such as the Internet.

Transmission Control Protocol (TCP)—refers to a core protocol of the internet protocol suite and provides delivery of a stream of octets between programs running on computers connected to a local area network, intranet, or the public Internet.

Ethernet—refers to a family of computer networking technologies for local area networks (LANs) as standardized in IEEE 802.3.

Local Area Network (LAN)—refers to a computer network that interconnects computers in a limited geographical area such as an office building or office complex.

Virtual Local Area Network (VLAN)—refers to a computer network that is logically segmented on an organizational basis, in other words, segmentation is based on functions or applications rather than on a physical or geographic basis as is the case with LANs.

Media Access Control (MAC) Layer—refers to the sublayer of a multi-layer computer network model which provides addressing and channel access control mechanisms that enable communication between multiple network nodes that share a common medium, such as Ethernet. MAC layer acts as an interface between the logical link control sublayer and the network's physical (PHY) layer.

Time-Sensitive (TS) Network—refers to networks adhering to the IEEE 802.1 standard for real-time data transfer.

Time-Sensitive (TS) Packet—refers to specific packets of data routed through a TS network that contain time-sensitive data. May include packets from a non-IEEE 802.1 compliant real-time network with a VLAN tag inserted using embodiments of the present invention.

Isochronous—refers generally to events that occur regularly, or in other words, at equal time intervals.

Asynchronous—refers generally to events that occur irregularly, or in other words, at unscheduled and intermittent time intervals.

Figure 1:
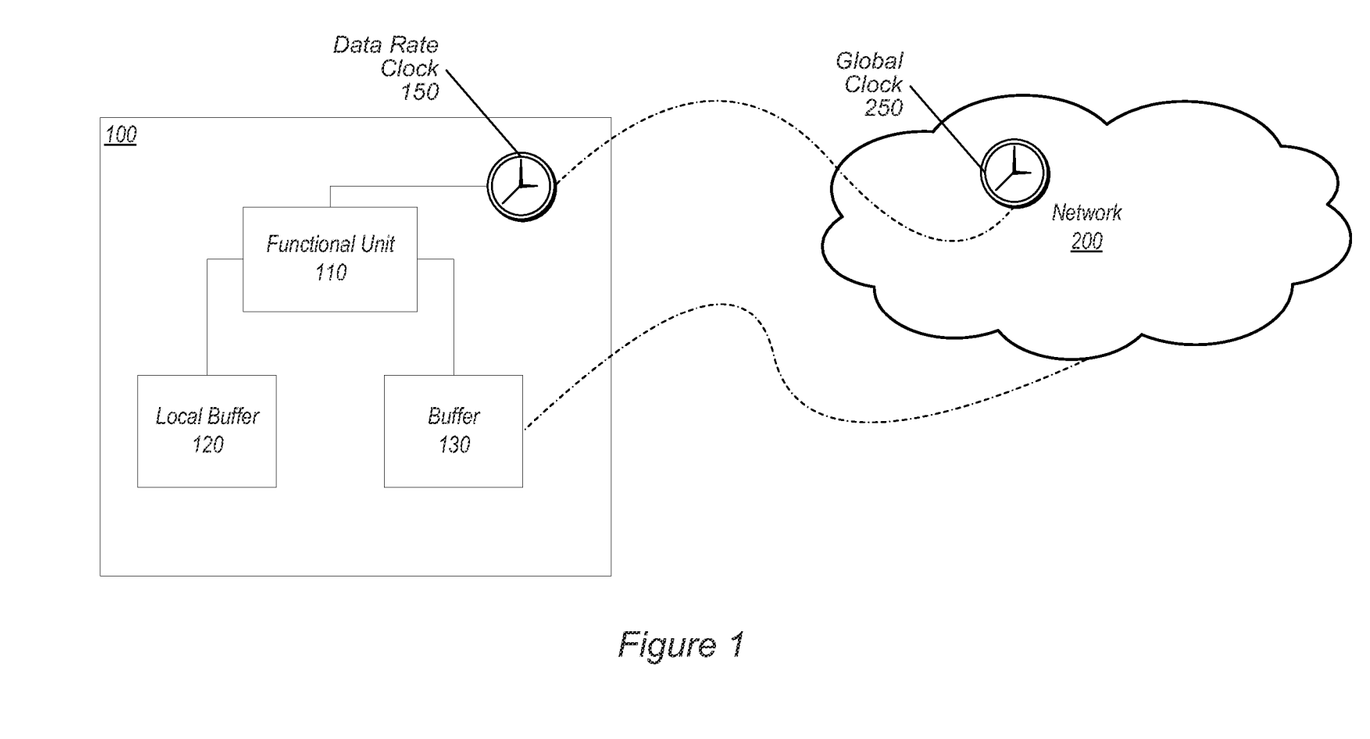
FIG. 1 illustrates a system configured to map an iterative time-based DAQ operation to an isochronous data transfer channel of a network, according to one embodiment.
Figure 2:
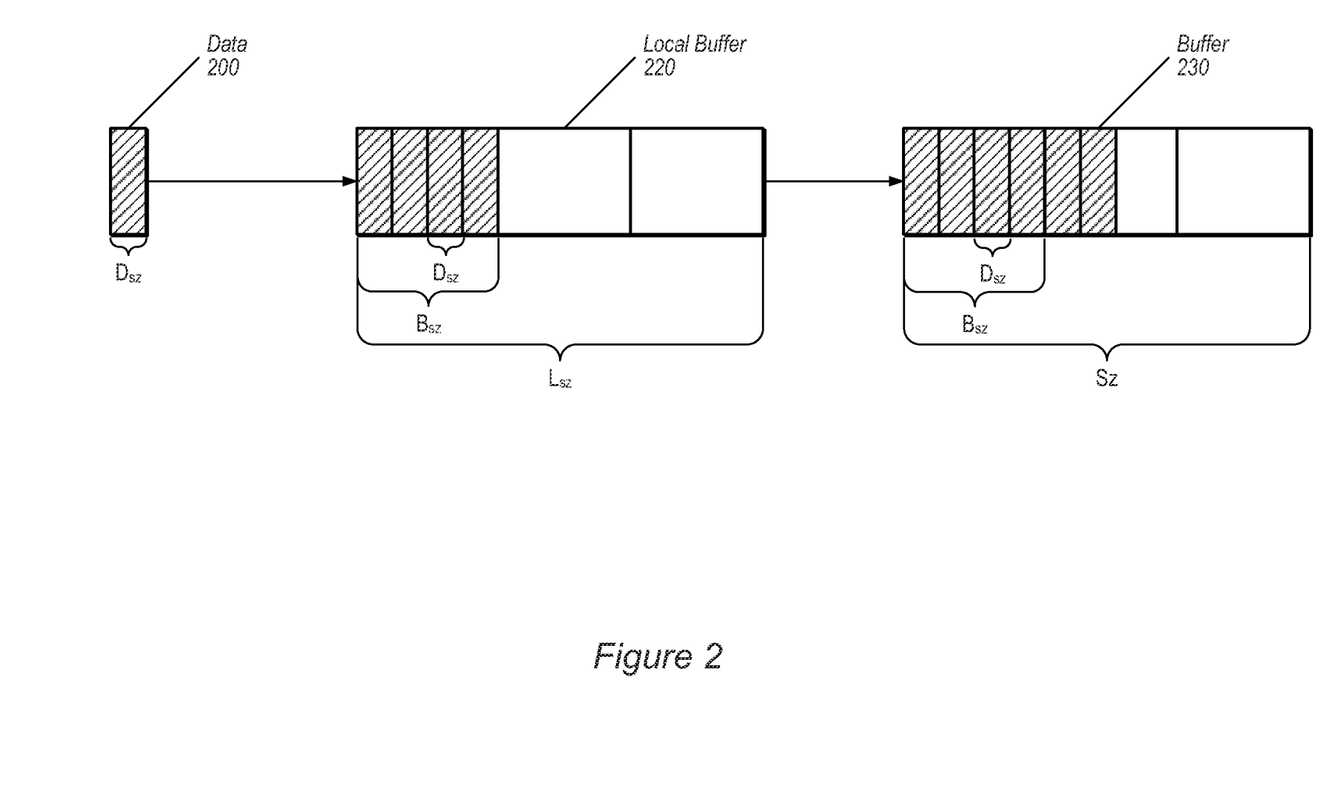
FIG. 2 illustrates a mapping of a continuous time-based DAQ to a buffer, according to one embodiment.
Figure 3:
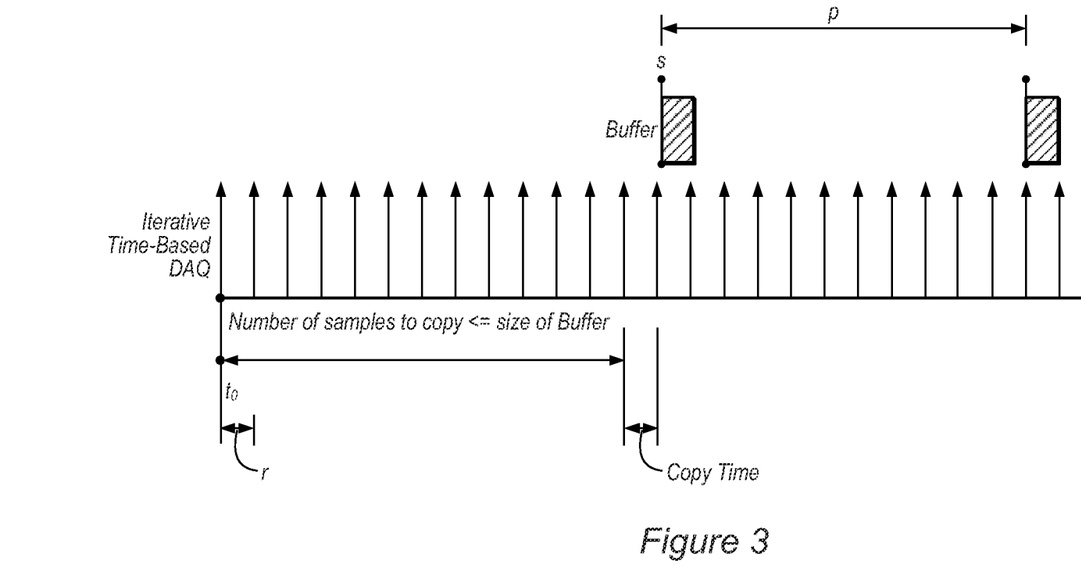
FIG. 3 illustrates an exemplary timeline of a buffer, according to one embodiment.

FIGS. 1-5: Systems and Methods for Mapping Time-Based Data to an Isochronous Data Transfer Channel FIG. 1 illustrates a system configured to map a continuous time-based DAQ to an isochronous data transfer channel of a network, according to an embodiment of the present invention. FIGS. 2 and 3 illustrate mapping the data associated with the time-based DAQ to a buffer and the transfer of the data from the buffer over time, respectively. Additionally, embodiments of methods for configuring the mapping and mapping of a time-based DAQ to an isochronous data transfer channel of a network are described below in reference to FIGS. 4 and 5.

As shown in FIG. 1, the system 100 may include a functional unit 110, a local buffer 120, a buffer 130, and a data rate clock 150. In certain embodiments, as further described below, the system 100 may be included in, or coupled to, a network interface controller (NIC). Additionally, in some embodiments, the system 100 may be coupled to, or included in a measurement device, such as a traditional stand-alone "box" instrument, a computer-based instrument (e.g., instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, or other similar types of devices.

Accordingly, in one embodiment, the system may be included in a NIC coupled to, or included in, a measurement device. Further, the measurement device may be a distributed measurement device, e.g., part of a network, such as a time-sensitive (TS) network, adhering to the IEEE 802.1 standard for real-time data transfer, or another real time network not adhering to the IEEE 802.1 standard, e.g., a real-time Ethernet network implementation such as PROFINET, which uses standards such as TCP/IP and Ethernet along with a mechanism for real time and isochronous real time communication, EtherCAT, which is an open high performance Ethernet-based fieldbus system, Ethernet/IP, which is designed for use in process control and other industrial automation applications, or Ethernet Powerlink, which is a deterministic real-time protocol for standard Ethernet, among others. Alternatively, the system may be included in a memory-mapped distributed system, such as peripheral component interconnect (PCI), PCI express (PCIe), or CompactPCI, among others. Examples of such systems include, among others, systems based on National Instruments Corporation's CompactRIO platform and systems based on National Instruments Corporation's PXI (PCI Extensions for Instrumentation) platform.

In one embodiment, the functional unit 110 may be coupled to the local buffer 120, the buffer 130, and the data rate clock 150. Note that, in certain embodiments, the system 100 may include one or more functional units, however, for simplicity, the functionality of the system 100 is described in terms of a single functional unit. Also note that the term functional unit may be used interchangeably with the term processing element and is meant in its broadest sense. In other words, the term functional unit, or processing element, refers to any of a variety of elements or combinations of such elements, as noted in the Terms section above. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

In an exemplary embodiment, the data rate clock 150 may be configured to synchronize to a global clock of a network, such as global clock 250 of network 200. In various embodiments, the system 100 may be included in or coupled to the network 200 via an Ethernet type connection, or alternatively, via a memory mapped bus, such as PCI, PCIe, or CompactPCI. Further, note that data rate clock 150 may be one of multiple data rate clocks included in system 100, e.g., data rate clock 150 may be one of a plurality of data rate clocks, each of which may be configured to synchronize to a global clock of a network, either directly or indirectly, e.g., via another clock synchronized to the global clock.

Buffer 130 may include a configurable buffer size and transfer frequency. A start time for transferring data to buffer 130 may be configured accordingly. In one embodiment, the start time for transferring the data may be configured based on the start time and data rate of the time-based DAQ. The buffer may be associated with the isochronous data transfer channel of the network 200.

Additionally, the size of the local buffer 120 may be configured. In one embodiment, the size of the local buffer 120 may be configured based the transfer frequency of the buffer and the data rate of the time-based DAQ. Thus, the size of the local buffer 120 may be dependent on the both the configuration of the buffer and the configuration of the time-based DAQ, as described in more detail in reference to FIGS. 2 and 3.

In one embodiment, the functional unit 110 may be configured to initiate performance of the time-based DAQ at the start time of the time-based DAQ. In some embodiments, the functional unit 110 may receive a trigger indicating the start time of the time-based DAQ. In other embodiments, the functional unit 110 may be configured to schedule the start time in accordance to a schedule provided to the functional unit 110.

The performance of the time-based DAQ may produce, or generate, data, and thus, the functional unit may be configured to transfer the data to the local buffer in response to the production or generation of data. Further, the functional unit 110 may be configured to, at the start time for transferring the data, initiate transfer of the data between the local buffer 120 and the buffer 130.

Note that in some embodiments, the data may not be transferred linearly from the iterative time-based DAQ to the buffer. For example, in one embodiment, data may accumulate in the local buffer prior to transfer to the buffer. Further, the buffer may not immediately communicate the data transferred from the local buffer. Rather, the buffer may accumulate additional data (e.g., more than one transfer of data from the local buffer) prior to communicating the data over the isochronous data transfer channel. In other embodiments, the local buffer may accumulate data, and a subset of the data may be transferred to the buffer and immediately communicated over the isochronous data transfer channel. In such embodiments, the size of the local buffer may be configured to prevent loss of data or the frequency of the buffer may be configured to prevent loss of data.

In an exemplary embodiment, the functional unit 110 may be further configured to perform a data integrity process which may prevent data loss during the transfer of the data between the local buffer 120 and the buffer 130. Accordingly, in one embodiment, the data integrity process may include or utilize a lossless algorithm, e.g., a data compression algorithm allowing reconstruction of the exact original data from compressed data. For example, the data integrity process may include embedding forward error correction code (FEC), a technique for controlling errors in data transmission in which redundancy in the sender message prevents data loss due to bit errors and network reconfiguration. Additionally, or alternatively, the data integrity process may include any other types of error correction algorithms, such as Reed Solomon, Hamming Codes, Viterbi, Erasure Coding, and Application-Level Forward Erasure Correction, among others.

In certain embodiments, the buffer 130 may be configured to communicate the data over the isochronous data transfer channel of the network 200 over a cycle of the buffer 130 at the transfer frequency of the buffer 130. Thus, the time-based DAQ may be mapped to the isochronous data transfer channel of the network 200.

FIG. 2 is an illustration of an exemplary mapping of continuous time-based DAQ to a buffer, such as buffer 130, according to one embodiment. As illustrated in FIG. 2, an iteration of the time-based DAQ may include a data transfer of data 200, which may include an associated data transfer size, $D_{sz}$. Thus, for each iteration, a transfer of data 200 to local buffer 220 may occur. Note that local buffer 220 may have similar or the same functionality as local buffer 120.

Local buffer 220 may include an associated block size, $B_{sz}$, where the block size may be a multiple of the data transfer size, $D_{sz}$. Accordingly, transferring a block of data may include one or more data transfers. In other words, a block of data may include data from multiple (one or more) time-based DAQ iterations. Additionally, local buffer 220 may have an associated size, $L_{sz}$, which may be greater than or equal to the block size, $B_{sz}$. Note, in some embodiments, the size of the local buffer may be equivalent to the data transfer size, $D_{sz}$. Further, in some embodiments, the size of the local buffer, $L_{sz}$, may be based on the size of the block, e.g., block size, $B_{sz}$, as well as the output frequency of buffer 230 and the data rate of the time-based DAQ.

Once data 200 have been transferred to local buffer 220, they may then be transferred to buffer 230. In some embodiments, FEC may be embedded in the data to increase resilience of the data such that re-transmission is not required. FEC is known to prevent data loss due to bit errors, EMI, and network reconfiguration. Note that data 200 may be transferred from local buffer 220 to buffer 230 as one or more blocks of data. The size, Sz, of buffer 230 may be configured along with a transfer frequency by a user, a functional unit coupled to the local buffer, a functional unit coupled to buffer 230, either locally or otherwise, or a computer system coupled to buffer 230, either locally or otherwise. Once data 200 have been transferred to buffer 230, buffer 230 may provide data 200, which may be included in one of the one or more blocks of data, over an isochronous data transfer channel of a network. The term network is meant to broadly include any of an Ethernet network, a real time network (e.g., an IEEE 802.1 compliant real time network or a non-IEEE 802.1 compliant real time network), or a memory-mapped bus, among others. Thus, since the isochronous channel may provide guaranteed delivery and FEC may remove the possibility of data loss due to bit errors, EMI, and network reconfiguration, data 200 may be provided over the network in a lossless manner.

FIG. 3 illustrates an exemplary timeline of a buffer, such as buffer 130, according to one embodiment of the invention. In such an embodiment, at the start time of a time-based DAQ, $t_0$, data may be produced or generated at a data rate, r, as indicated by each upward arrow, and written, or copied, into a local buffer, such as local buffer 120 described above in reference to FIG. 1. The start time, s, of the buffer may be calculated using $t_S$, the start time of the time-based DAQ, the size of the buffer, Sz, the size of the data, $D_{sz}$, acquired each iteration of the time-based DAQ, and r, the data rate. Note that "copy time" indicates the time necessary to transfer data from the local buffer to the buffer every period, p, of the buffer. Note further, that the buffer may be configured to transfer data, e.g., one or more blocks of data, periodically, e.g., at a transfer frequency. Thus, in certain embodiments, the start time, s, of the buffer may be represented mathematically by equation 1:

$$s = t_0 + (Sz*r)D_{sz} + \text{Copy Time} \qquad (1)$$

Further, the buffer may be configured with a combination of size and frequency to ensure that the local buffer may always have data to output to the buffer at the configured transfer frequency. Also note that by increasing either the local buffer size or the size of the buffer, embodiments where the data rate and transfer frequency of the buffer are not integer multiples of one another may be accommodated or implemented. Additionally, in certain embodiments, the size of the data transferred to the buffer, or the data payload size, may be provided along with the data. Said another way, the buffer may transmit a packet of data equivalent to the size of the buffer when the buffer is not full. Thus the buffer may transmit a packet of data that includes empty, or filler, data. In such instances, the data payload size may be included in the packet of data transmitted so that the empty, or filler, data may be ignored by a consumer of the data transmitted by the buffer. In other words, where the data rate is not an integer multiple of the transfer frequency of the buffer, the size of the local buffer and buffer may be configured to allow for lossless data transfer and, in some embodiments, the data payload size may be included in the data transferred by the buffer. For example, in one embodiment, where the start time, s, of the buffer may be represented by equation 1, the size of the local buffer, $L_{sz}$, may be represented mathematically by equation 2:

$$L_{sz} = \frac{(Sz(p + \text{Copy Time}))}{r} \qquad (2)$$

Alternatively, in certain embodiments, the size of the buffer, Sz, may be determined based on the size of the local buffer, $L_{sz}$, as represented mathematically by equation 3:

$$Sz = \frac{L_{sz}*r}{(p + \text{Copy Time})} \qquad (3)$$

Further, in yet another embodiment, the frequency, or period, p, of the buffer may be determined based on the size of both the local buffer, $L_{sz}$, and the size, Sz, of the buffer, as represented mathematically by equation 4:

$$p = \frac{L_{sz}*r}{Sz} - \text{Copy Time} \qquad (4)$$

Figure 4:
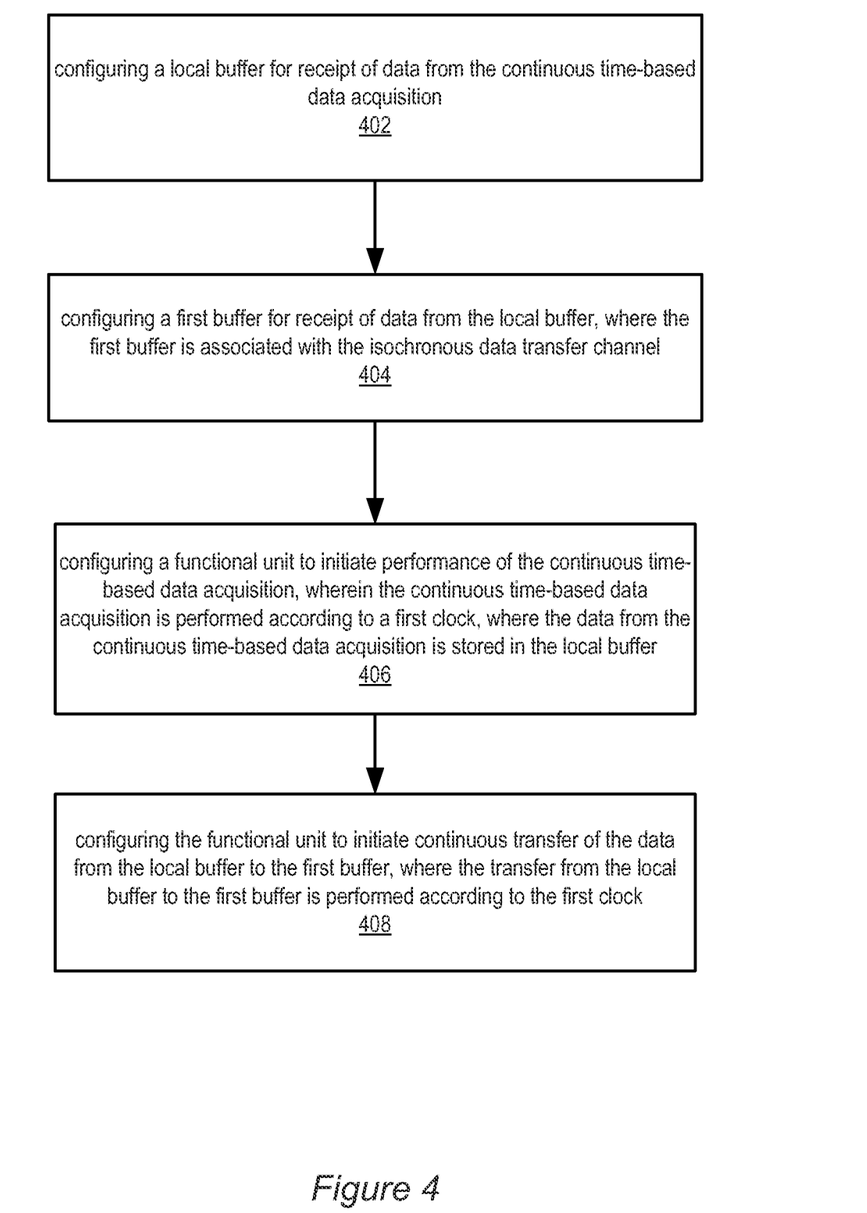
FIG. 4 is a flowchart diagram illustrating one embodiment of a method for configuring the mapping of a continuous time-based DAQ to an isochronous data transfer channel of a network.

FIG. 4 is a flowchart diagram illustrating one embodiment of a method for configuring the mapping of a time-based DAQ to an isochronous data transfer channel of a network. The method shown in FIG. 4 may be used in conjunction with any of the systems or devices described above in reference to FIGS. 1-3, among other systems and devices. In various embodiments, some of the method elements shown may be performed concurrently, in a different order than shown, or may be omitted. Additional method elements may also be performed as desired. As shown, the method may operate as follows.

First, in 402 a local buffer may be configured for receipt of data from the time-based DAQ. Note, the buffer may be configured by a functional unit, such as functional unit 110, or the buffer may be configured by another functional unit or computer system coupled to the buffer, e.g., either via a memory mapped bus or a network connection, among other communicative couplings. In 404, a first buffer (e.g., buffer 130 or 230) may be configured for receipt of data from the local buffer. The first buffer may be associated with the isochronous data transfer channel.

In 406, a functional unit may be configured to initiate performance of the continuous time-based data acquisition. The (continuous) time-based data acquisition may be performed according to a clock and the data from the time-based data acquisition may be stored in the local buffer. In certain embodiments, the clock (e.g., a data rate clock) may be one of a plurality of clocks. In such embodiments, a first clock may be synchronized to a global clock and each additional clock of the plurality of clocks may synchronize to the global clock via the first clock. In other embodiments, the clock may synchronize to a local clock and the local clock may synchronize to the global clock.

In 408, the functional unit may be configured to initiate continuous transfer of the data from the local buffer to the first buffer. The transfer from the local buffer to the first buffer may be performed according to the clock, e.g., the first clock.

In further embodiments, a start time for transferring data to the buffer may be configured. In some embodiments, the start time may be based on the size of the buffer. Additionally, the start time may be based on a start time and data rate of the time-based DAQ. The data rate may be in accordance with the clock. The start time of the time-based DAQ may be in phase with the global clock of the network. Further, the start time may be based on the amount (e.g., the size of a block) of the data transferred.

In some embodiments, a size of a local buffer may be configured. The size of the local buffer may be based on the amount the data transferred and the data rate of the time-based DAQ. Additionally, in some embodiments, the size of the local buffer may be further based on the transfer frequency of the buffer. Further, in a particular embodiment, the size of the local buffer may be further based on a copy time, i.e., the amount of time required to read the data from the local buffer and write the data to the buffer. Further, in certain embodiments, the local buffer may be further configured as a first-in-first-out (FIFO) buffer.

Note, in certain embodiments, the functional unit may be configured by a user of the system. In other embodiments, the functional unit may be configured by another functional unit or computer system coupled to the functional unit. Additionally, in some embodiments, the start time of the time-based DAQ may be received by the functional unit as a trigger indicating the start time of the time-based DAQ. In other embodiments, the functional unit may be configured to schedule the start time in accordance to a schedule provided to the functional unit.

In certain embodiments, transferring of the one or more blocks of data between the local buffer and the buffer may include the functional unit performing a data integrity process during the transfer. The data integrity process may prevent data loss. In one embodiment, the data integrity process may include embedding forward error correction code.

In one embodiment of the method, the functional unit may also be configured to configure the buffer size and transfer frequency of the buffer. Additionally, in certain embodiments, the functional unit may be configured to configure the clock and the start time for transferring the data between the local buffer and the buffer. Further, the functional unit may be configured to configure the size of the local buffer and to configure the local buffer for transferring the data.

In another embodiment of the method, another, or an additional, functional unit may be configured to configure the buffer size and transfer frequency of the buffer. Additionally, in certain embodiments, the additional functional unit may be configured to configure the clock and the start time for transferring the data between the local buffer and the buffer. Further, the additional functional unit may be configured to configure the size of the local buffer and to configure the local buffer for transferring the data.

In yet another embodiment of the method, a plurality of time-based DAQs may be configured. In such embodiments, the plurality of time-based DAQs may include the time-based DAQ and one or more additional time-based DAQs. Hence, for each of the one or more additional time-based DAQs, a start time, a clock and a size of a local buffer may be configured, respectively. Accordingly, each local buffer associated with each time-based DAQ may be configured for transfer of the data produced, or generated, by the respective time-based DAQ associated with the local buffer. Thus, the plurality of time-based DAQs may have a corresponding plurality of local buffers and clocks.

In some embodiments that include a plurality of time-based DAQs, the functional unit may be configured to, for each of the plurality of time-based DAQs initiate performance of the time-based DAQ at a respective start time of the time-based DAQ, and transfer respective data to the respective local buffer in response to the performance of the time-based DAQ. Additionally, the functional unit may be configured to, for each of the plurality of time-based DAQs, initiate transfer of respective data between the respective local buffer and the buffer at the start time for transferring the data, and repeat the transferring and the initiating transfer one or more times, thereby transferring the data from the respective local buffer to the buffer. Accordingly, in certain embodiments, the functional unit may, for each of the plurality of time-based DAQs, perform the actions for which it is configured.

Further, in certain embodiments, the buffer may be configured to communicate the respective data for each time-based DAQ over the isochronous data transfer channel of the network over at least one cycle at the transfer frequency of the buffer, thereby mapping the plurality of time-based DAQs to the isochronous data transfer channel of the network. In other words, the plurality of local buffers may be multiplexed to a single buffer for communication over the isochronous data transfer channel of the network. Accordingly, in certain embodiments, the buffer may communicate the respective data for each time-based DAQ over the isochronous data transfer channel of the network over at least one cycle at the transfer frequency of the buffer, thereby mapping the plurality of iterative time-based DAQ operations to the isochronous data transfer channel of the network.

Additionally, in some embodiments that include the plurality of time-based DAQs, the method may further include performing: configuring buffer size and transfer frequency, and configuring a start time for transferring data, for each of one or more additional buffers. Additionally, each of the one or more additional buffers may be associated with a corresponding functional unit of one or more additional functional units. Thus, the buffer and the additional one or more buffers may compose a plurality of buffers, and the functional unit and the one or more additional functional units may compose a plurality of functional units. Accordingly, the plurality of time-based DAQs with the corresponding plurality of local buffers may be mapped to the plurality of buffers. Hence, each of the plurality of buffers may be configured to communicate respective data over a corresponding isochronous data transfer channel of the network at a respective transfer frequency of the respective buffer, thereby mapping the plurality of time-based DAQs to a plurality of isochronous data transfer channels of the network.

Note that in various embodiments the mapping may be linear, e.g., one-to-one, or non-linear. In other words, a time-based DAQ may be mapped to a corresponding buffer, e.g., a linear or one-to-one mapping. Alternatively, the mapping may be non-linear, e.g., there may not be a corresponding buffer for each time-based DAQ. For example, a first time-based DAQ may be mapped to a first buffer whereas a second and a third time-based DAQ may be mapped to a second buffer, and so forth.

Additionally, in such embodiments, for each respective buffer of the plurality of buffers, a corresponding functional unit of the plurality of functional units may be configured to, for at least one time-based DAQ of the plurality of time-based DAQs, initiate continuous performance of the at least one time-based DAQ at a respective start time of the at least one time-based DAQ, transfer the data to the respective local buffer in response to the performance of the at least one time-based DAQ, initiate transfer of the data between the respective local buffer and the buffer at the start time for transferring the data, and repeat said transferring and said initiating transfer one or more times, thereby transferring the respective data between the respective local buffer and the respective buffer. Further, each of the plurality of buffers may be configured to communicate the respective data from each of the plurality of buffers over a corresponding isochronous data transfer channel of the network at the respective transfer frequency of the respective buffer, thereby mapping the plurality of time-based DAQs to a plurality of isochronous data transfer channels of the network. Accordingly, in certain embodiments, the method may further include, for each respective buffer of the plurality of buffers, the corresponding functional unit of the plurality of functional units may perform, for at least one time-based DAQ of the plurality of time-based DAQs, the above actions for which it is configured.

In certain embodiments, the method may further include configuration and performance of time-based control. In such embodiments, the functional unit may include a first functional unit, the local buffer may include a first local buffer, the buffer may be or include a first buffer, the clock may be or include a first clock, and the isochronous data transfer channel may be or include a first isochronous data transfer channel. The method may further include configuring buffer size of a second buffer for the time-based control. The second buffer may be associated with a second isochronous data transfer channel of the network.

In addition, the method may further include configuring a transfer frequency of the second buffer and configuring a second data rate clock, associated with the time-based control operation, to synchronize to the global clock of the network. Also, the method may include configuring a second start time for transferring data from the second buffer. The second start time for transferring data may be based on the buffer size of the second buffer, a start time of the time-based control operation, a data rate of the time-based control operation in accordance with the second clock, and size of the data transferred. In certain embodiments, the start time of the time-based control operation may be in phase with the global clock of the network. Further, a size of a second local buffer may be configured, e.g., based on the size of the data transferred, the transfer frequency of the second buffer, and the data rate of the time-based control operation. The second local buffer may also be configured for transfer of the data from the second local buffer in response to continuous performance of the time-based control operation.

Accordingly, a second functional unit may be configured to initiate the continuous performance of the time-based control operation at the start time of the time-based data operation, transfer the data from the local buffer in response to the continuous performance of the time-based control operation, initiate transfer of the data between the second local buffer and the second buffer at the second start time for transferring the data, and repeat the transferring and initiating transfer one or more times in an iterative manner, thereby transferring the data between the second local buffer and the second buffer. Hence, the second buffer may be configured to communicate the data over a second isochronous data transfer channel of the network over at least one cycle at the transfer frequency of the second buffer, thereby mapping the time-based control operation to the second isochronous data transfer channel of the network. Note, that in some embodiments, the second functional unit may perform the above actions for which it is configured.

In an exemplary embodiment that includes both a time-based DAQ operation and a time-based control operation, the functional unit may be configured to implement or operate as both the first and second function units discussed above, and similarly, the buffer may be configured to implement or operate as both the first and second buffers. In other words, the method may be performed using a single functional unit and a single buffer. Thus, the functional unit may include the first functional unit and the second functional unit and the buffer may include the first buffer and the second buffer. Accordingly, a single isochronous data transfer channel may be configured as both the first and second isochronous data transfer channel. Thus, the isochronous data transfer channel may include the first isochronous data transfer channel and the second isochronous data transfer channel of the network.

Note, that in certain embodiments, the first buffer may be a first partition of the buffer and the second buffer may be a second partition of the buffer. Accordingly, the time-based DAQ may be mapped to the first partition of the buffer and the time-based control operation may be to the second partition of the buffer. In such embodiments, the buffer size and transfer frequency of the buffer may be configured to accommodate both operations.

Figure 5:
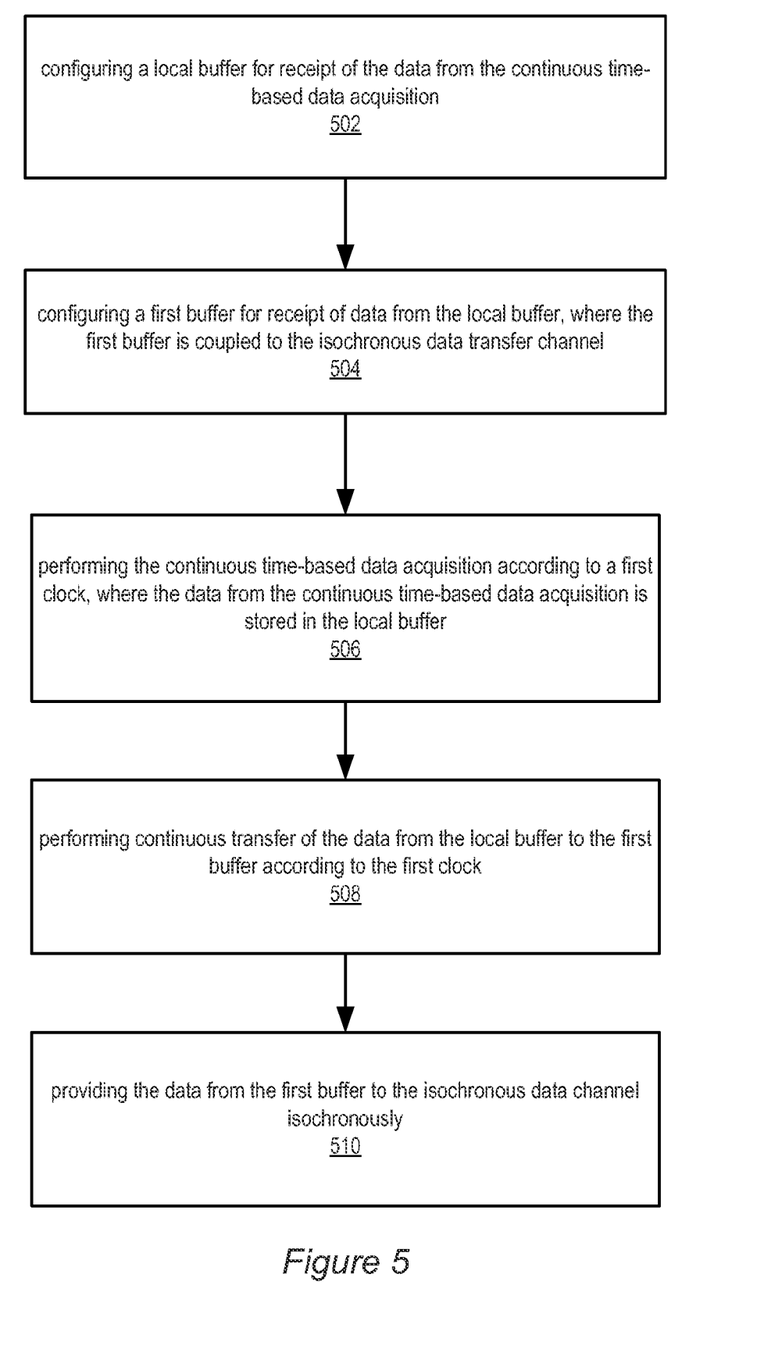
FIG. 5 is a flowchart diagram illustrating an embodiment of a method for mapping of a continuous time-based DAQ to an isochronous data transfer channel of a network.

FIG. 5 is a flowchart diagram illustrating one embodiment of a method for mapping of a time-based DAQ to an isochronous data transfer channel of a network. The method shown in FIG. 5 may be used in conjunction with any of the methods, systems or devices described above in reference to FIGS. 1-4, among other systems and devices. In various embodiments, the method described in FIG. 4 may be used to configure a system to perform embodiments of the method. Alternatively, other methods may be used to prepare the system to perform embodiments. In various embodiments, some of the method elements shown may be performed concurrently, in a different order than shown, or may be omitted. Additional method elements may also be performed as desired. As shown, the method may operate as follows.

In 502, a local buffer may be configured for receipt of the data from a time-based DAQ (e.g., a continuation time-based DAQ). In some embodiments, a size of the local buffer may be specified. In an exemplary embodiment, the size of the local buffer may be determined as described above.

In 504, a buffer (e.g., a first buffer), such as buffer 130 described above, may be configured for receipt of data from the local buffer. The buffer may be coupled to an isochronous data transfer channel. In an exemplary embodiment, the buffer may be configured using embodiments of the methods described above.

In 506, the time-based DAQ may be performed according to a clock (e.g., a first clock, or a data rate clock). The data from the time-based DAQ may be stored in the local buffer.

In 508, the data may be transferred (e.g., continuously) from the local buffer to the buffer according to the clock. The local buffer may be a first-in-first-out (FIFO) buffer and may continue to transfer data to the buffer so long as the time-based DAQ is being performed (i.e., generating data).

In 510, the data may be isochronously provided from the buffer to the isochronous data channel. Note that as described above, the rate data are provided to the buffer may not match or be an integer multiple of the rate at which the buffer provides the data to the isochronous data channel.

Figure 6:
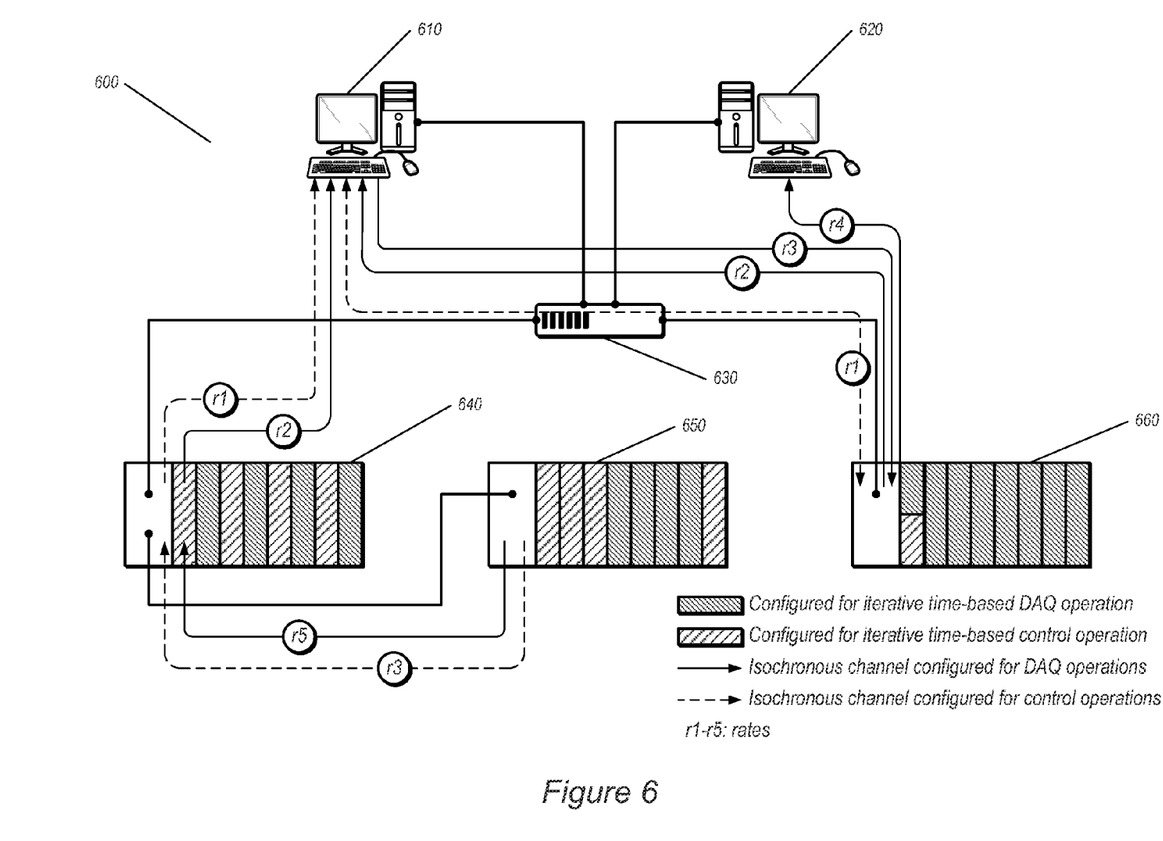
FIG. 6 illustrates a distributed measurement and control system, according to one embodiment.
Figure 7:
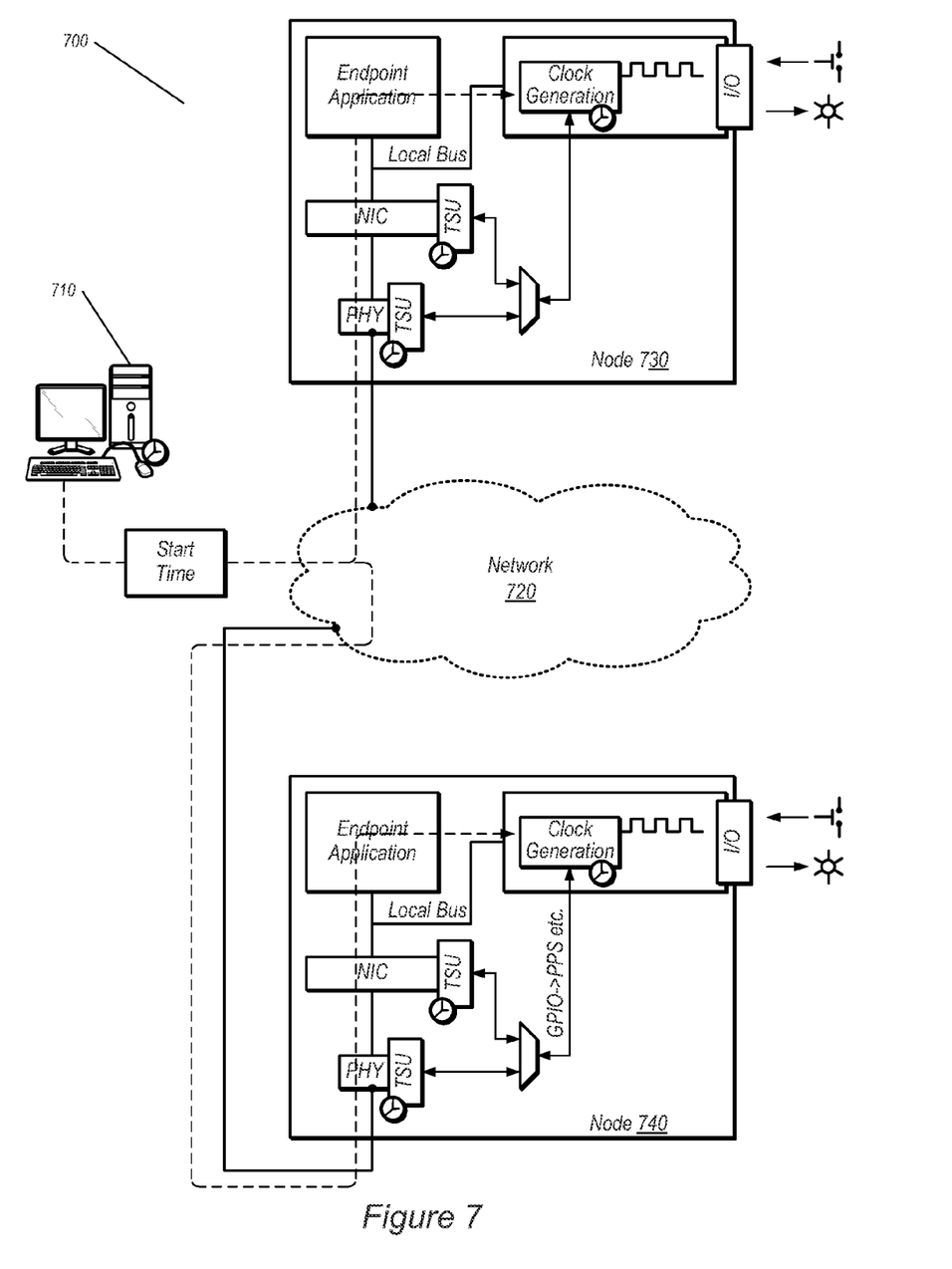
FIG. 7 illustrates another distributed measurement and control system, according to one embodiment.

FIGS. 6-7: Further Embodiments of Distributed Control and Measurement Systems

FIGS. 6 and 7 illustrate further embodiments of the above described systems and methods. Note that these embodiments, although described in detail, are exemplary only and numerous variations and modifications will become apparent to those skilled in the art.

FIG. 6 illustrates a distributed control and measurement system 600 according to one exemplary embodiment. As illustrated, the distributed measurement control system 600 may include one or more computer systems, such as computer systems 610 and 620. The system 600 may also include or more distributed measurement and control devices, such as devices 640, 650, and 660. Note that one of the advantages of the systems and methods for time-based data transfer described herein is the ability of the same device, e.g., any of devices 640-660, to be capable of exchanging control, e.g., via a time-based control operation, and measurement data, e.g., via a time-based DAQ operation, simultaneously or concurrently. Thus, each channel on a device, such as any of devices 640-660, may be configured independently based on operation (time-based control (dashed lines) or time-based DAQ (solid lines)), or function. Further, data may be mapped onto one or more buffers, with or without a data integrity process such as FEC, based on degree of lossless behavior desired. Additionally, the one or more buffers may be configured to transfer data over isochronous transfer channels at the same or disparate frequencies or rates, such as any of rates r1-r5. Accordingly, all channels may use a common notion of time, e.g., data rate clocks may all be synchronized to a global clock of the network and start times may all be in phase with the global clock, and may transmit data as disparate frequencies, or rates, without compromising determinism.

Further, in certain embodiments, the computer systems 610-620 may be coupled to the distributed measurement and control devices 640-660 via a network switch such as network switch 630. Thus, in some embodiments, computer systems 610-620 and distributed measurement and control devices 640-660 may include a network interface controller (NIC). Note, in certain embodiments, the network switch 630 may include a network switch adhering to the IEEE 802.1 standard for real-time data transfer. In other embodiments, the network switch 630 may include a network switch that does not adhere to the IEEE 802.1 standard for real-time data transfer, such as a network switch for PROFINET, which uses standards such as TCP/IP and Ethernet along with a mechanism for real time and isochronous real time communication, EtherCAT, which is an open high performance Ethernet-based fieldbus system, Ethernet/IP, which is designed for use in process control and other industrial automation applications, or Ethernet Powerlink, which is a deterministic real-time protocol for standard Ethernet, among others. In yet other embodiments, it is envisioned that network switch 630 may include a memory controller and the network may be a memory mapped network such as PCI, PCIe, or compactPCI, among others.

An exemplary implementation of the above described systems and methods is illustrated as exemplary device 660. Device 660 may include multiple time-based DAQ operations and a time-based control operation and a local buffer may be associated with each operation. Additionally, device 660 includes multiple, e.g., one or more, clocks (e.g., data rate clocks), a respective clock associated with a respective time-based operation. Device 660 may also include a plurality of functional units, each associated with a respective isochronous channel, e.g., an isochronous data transfer channel, and thus, a respective buffer with a respective rate of transfer r1-r4. Thus, a functional unit, for a respective buffer, may be configured to, for at least one time-based DAQ, initiate continuous performance of the at least one time-based DAQ of the plurality of time-based DAQs at the respective start time, transfer respective data to the respective local buffer in response to the continuous performance of the at least one time-based DAQ, initiate transfer of respective data from a respective local buffer to the respective buffer at a respective start time for transferring the respective data, and repeat the transferring and initiating transfer one or more times in an iterative manner, thereby transferring the respective data between the respective local buffer and the respective buffer. Further, the time-based control operation may be associated with a functional unit which may be configured with embodiments of the invention as previously described.

FIG. 7 illustrates a distributed control and measurement system according to another exemplary embodiment. A system 700 may include a computer system 710 coupled to a network 720. In one embodiment, network 720 may adhere to the IEEE 802.1 standard for real-time data transfer. Additionally, the system may include nodes 730 and 740, also coupled to the network 720. Each node may include or implement an embodiment of the techniques disclosed herein. Nodes 730 and 740 may include clock generation circuits which may be synchronized using signals created by time stamp units (TSUs) in network interfaces. The nodes may also include a NIC coupled to a TSU, a physical layer (PHY) coupled to a second TSU, as well as an endpoint application, all coupled to the clock generation circuit via a local bus. The nodes may each also include a functional unit, a local buffer, and a buffer, all coupled to the local bus. The clock generation circuit may include one or more data rate clocks, each synchronized to a global clock of the network 720, via either the TSU of the NIC or the TSU of the PHY. Thus, a start time sent from computer system 710 to each node may be used to create coordinated sample events that drive physical acquisition/generation, e.g., to initiate time-based DAQ and control operations. For example, once the functional unit of node 730 initiates continuous performance of a time-based DAQ operation and transfers data to the local buffer, the functional unit may initiate transfer of the data to buffer and the buffer may communicate the data over the network 720 via an isochronous data transfer channel. In such a manner, data may be transferred between nodes 730 and 740 via buffers.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for mapping of continuous time-based data acquisitions to isochronous data transfer channels of a network, the method comprising:

initiating performance of each respective continuous time-based data acquisition at a start time of the continuous time-based data acquisition, wherein the respective continuous time-based data acquisition is performed according to a first clock, wherein the first clock is synchronized to a global clock of the network, wherein the start time of the respective continuous time-based data acquisition is based on the global clock of the network, and wherein the data from the respective continuous time-based data acquisition is stored in respective local buffers;

transfer the data from each respective local buffer to respective first buffers, wherein the transfer from the respective local buffer to the respective first buffer is performed according to the first clock, and wherein each first buffer is associated with a respective isochronous data transfer channel; and communicating, from each first buffer, at the start time of the first buffer, respective data for the respective continuous time-based data acquisition over the respective isochronous data transfer channel of the network at a transfer frequency of the respective first buffer, thereby mapping the respective continuous time-based data acquisition to the respective isochronous data transfer channel of the network;

wherein the start time of each first buffer is based on a buffer size of the first buffer, the start time of the respective continuous time-based data acquisition, a data rate of the respective continuous time-based data acquisition, and a time necessary to transfer data from the respective local buffer to the first buffer.

2. The method of claim 1, further comprising:
configuring each first buffer for receipt of data from a respective local buffer, comprising:
configuring the buffer size of the first buffer; and
configuring the transfer frequency of the first buffer.

3. The method of claim 1, further comprising:
configuring each local buffer, including configuring a size of the local buffer based on a transfer frequency of the respective first buffer and a data rate of the respective continuous time-based data acquisition.

4. The method of claim 1, further comprising:
wherein said transferring the data from each local buffer to the respective first buffer further comprises performing a data integrity process during the continuous transfer, thereby preventing data loss.

5. The method of claim 4, wherein the data integrity process comprises:
embedding a forward error correction code in the data, wherein said performing the data integrity process uses the embedded forward error correction code.

6. The method of claim 1, wherein each local buffer is a first local buffer, wherein each isochronous data transfer channel comprises a first isochronous data transfer channel, wherein each functional unit comprises a first functional unit, and wherein the method further comprises:
configuring a second local buffer for receipt of data from a continuous time-based control operation;
configuring a second buffer for receipt of data from the second local buffer, wherein the second buffer is coupled to a second isochronous data transfer channel; and
initiating performance of the continuous time-based control operation, wherein the continuous time-based control operation is performed according to a second clock, wherein the data from the continuous time-based control operation is stored in the second local buffer; and
initiating continuous transfer of the data from the second local buffer to the second buffer, wherein the transfer from the second local buffer to the second buffer is performed according to the second clock.

7. The method of claim 6, wherein at least one of the first buffers comprises the second buffer, and wherein at least one of the isochronous data transfer channels further comprises the second isochronous data transfer channel.

8. The method of claim 1, wherein the network comprises:
a real time network;
an Ethernet network; or
a memory mapped bus.

9. The method of claim 1, further comprising:
repeating said initiating performance and transferring, thereby transferring the data between the respective local buffer and the respective first buffer.

10. The method of claim 1, wherein the start time of the respective continuous time-based data acquisition is in phase with the global clock of the network.

11. The method of claim 1, further comprising:
configuring each first buffer to communicate at the start time of the first buffer.

12. The method of claim 1, further comprising:
configuring the start time of each transfer of data from the respective local buffer to the respective first buffer based on the buffer size of the respective first buffer, the start time of the respective continuous time-based data acquisition, and the data rate of the respective continuous time-based data acquisition;
wherein said transferring comprises:
initiating each transfer of data from the respective local buffer to the respective first buffer at the start time of the transfer.

13. A system for mapping a continuous time-based data acquisition to an isochronous data transfer channel of a network, the system comprising:
a plurality of functional units;
a plurality of local buffers, coupled respectively to the plurality of functional units, and configured to receive data from respective continuous time-based data acquisitions;
a plurality of first buffers, coupled respectively to the plurality of functional units and the plurality of local buffers, wherein each first buffer is configured to receive data from the respective local buffer, wherein each first buffer is associated with a respective isochronous data transfer channel, wherein a start time of each first buffer is configured based on a buffer size of the first buffer, a start time of the continuous time-based data acquisition, and a data rate of the continuous time-based data acquisition;
wherein each functional unit is configured to:
initiate performance of a respective continuous time-based data acquisition at a start time of the continuous time-based data acquisition, wherein the respective continuous time-based data acquisition is performed according to a first clock, wherein the first clock is synchronized to a global clock of the network, wherein the start time of the continuous time-based data acquisition is based on the global clock of the network, and wherein the data from the continuous time-based data acquisition is stored in the respective local buffers; and
transfer the data from the respective local buffer to the respective first buffer at the start time of the respective continuous transfer, wherein the transfer from the respective local buffer to the respective first buffer is performed according to the first clock, and wherein each first buffer is associated with a respective isochronous data transfer channel; and
communicate, from the respective first buffer, at the start time, respective data for the respective continuous time-based data acquisition over the isochronous data transfer channel of the network at a transfer frequency of the respective first buffer, thereby mapping the respective continuous time-based data acquisition to the respective isochronous data transfer channel of the network;

wherein the start time of each first buffer is based on a buffer size of the first buffer, the start time of the respective continuous time-based data acquisition, a data rate of the respective continuous time-based data acquisition, and a time necessary to transfer data from the respective local buffer to the first buffer.

14. The system of claim 13, wherein each first buffer has a configurable buffer size and a configurable transfer frequency.

15. The system of claim 13, wherein each local buffer has a size, wherein the size is configured based on a transfer frequency of the respective first buffer and a data rate of the respective continuous time-based data acquisition.

16. The system of claim 13, wherein to transfer the respective data from the respective local buffer to the respective first buffer, each functional unit is further configured to perform a data integrity process during the transfer, thereby preventing data loss.

17. The system of claim 16, wherein the data integrity process comprises:

embedding a forward error correction code in the data, wherein said performing the data integrity process uses the embedded forward error correction code.

18. The system of claim 13, wherein the network comprises:

a real time network;
an Ethernet network; or
a memory mapped bus.

19. The system of claim 13, wherein each functional unit is further configured to:

repeat said initiating performance and initiating the transfer, thereby transferring the data between the respective local buffer and the respective first buffer.

20. The system of claim 13, wherein the start time of the respective continuous time-based data acquisition is in phase with the global clock of the network.

21. The system of claim 13, wherein each first buffer is configured to communicate at the start time of the first buffer.

22. The system of claim 13, wherein the start time of each transfer of data from the respective local buffer to the respective first buffer is configured based on the buffer size of the respective first buffer, the start time of the respective continuous time-based data acquisition, and the data rate of the respective continuous time-based data acquisition; and wherein each transfer of data from the respective local buffer to the respective first buffer is initiated at the start time of the transfer.

* * * * *